United States Patent [19]
Watanabe et al.

[11] Patent Number: 4,494,337
[45] Date of Patent: Jan. 22, 1985

[54] CONSTRUCTION OF DOOR IN MOTOR VEHICLE

[75] Inventors: Hiroyuki Watanabe, Toyota; Mikio Ohashi, Aichi, both of Japan

[73] Assignee: Toyota Tidosha Kabushiki Kaisha, Toyota, Japan

[21] Appl. No.: 566,425

[22] Filed: Dec. 28, 1983

[30] Foreign Application Priority Data

Dec. 29, 1982 [JP] Japan .................. 57-233599

[51] Int. Cl.³ .................................. E05F 11/38
[52] U.S. Cl. ............................ 49/374; 49/428
[58] Field of Search ............ 49/374, 375, 227, 502, 49/428

[56]   References Cited
U.S. PATENT DOCUMENTS 2,024,773 12/1935 Lohrman ...................... 49/374
2,941,838  6/1960 Wernig ...................... 49/374 X
4,240,227 12/1980 Hasler et al. ................ 49/374 X

FOREIGN PATENT DOCUMENTS 158321 4/1981 Japan .

Primary Examiner—Kenneth Downey
Attorney, Agent, or Firm—Finnegan, Henderson, Farabow, Garrett & Dunner

[57]   ABSTRACT

In construction of a door in a motor vehicle, in which a slide piece or pieces secured to end portion of a door glass are slidably coupled into a guide groove of a guide portion of a door frame to thereby guide the door glass in the vertical direction, the outer surface of the door glass and the outer surface of the door frame are substantially flush with each other, and the construction includes a door glass weather strip for sealing between the door glass and the door frame and a door weather strip for sealing between the door and the body when the door is closed, the door glass weather strip is provided closer to the compartment's side than said guide portion, the slide piece is secured to the forward end of a bracket projecting outwardly from an end edge of the door glass substantially in parallel to the glass surface, the guide portion is opened toward the end edge of the door glass to thereby form a guide groove for enclosing said slide piece, the outer wall surface of the guide portion is made substantially flush with the door glass, and the door weather strip is mounted at a position offset closer to a center pillar in the longitudinal direction than an end face of the door glass weather strip, which is farthest from the center pillar in the longitudinal direction and on the compartment's side in the rear of the door glass weather strip.

12 Claims, 4 Drawing Figures

CONSTRUCTION OF DOOR IN MOTOR VEHICLE

BACKGROUND OF THE INVENTION

1. Field of the Invention

This invention relates to construction of a door in a motor vehicle, and more particularly to improvements in construction of a door in a motor vehicle, wherein the outer surface of a door glass and the outer surface of a door frame are substantially flush with each other.

2. Description of the Prior Art

As a means for reducing the air resistance and the wind breaking sounds during running and improving the appearance, there has been proposed a so-called flush-surfaced motor vehicle, wherein the outer surface of the vehicle body is flushed up.

As one problem in the case of the outer surface of the vehicle body being flushed up, there is a difference in stage between a door frame and a door glass.

More specifically, the door glass is expanded out due to a difference in pressure between the interior and the exterior of a compartment during running of the motor vehicle at high speed. However, in order to regulate this, it becomes necessary to provide a guide for pressing the outer peripheral portion of the door glass from outside. In consequence, the outer surface of the guide and the outer surface of the door glass should necessarily have a difference in stage therebetween.

In order to obviate the above-described disadvantage, as described in the specification of U.S. Pat. No. 2,024,773 for example, there has been made a proposal in which substantially a crank-shaped flange is coupled to an end edge of the door glass, and an end portion of this crank-shaped flange is guided in the vertical direction by a guide having a U-shaped cross-section, whereby the center of the guide is offset from the door glass toward the interior of the vehicle body to thereby flush the outer surface of the door frame with the outer surface of the door glass.

However, the above-described construction of the guide providing the flange at the end edge of the door glass presents such a disadvantage that the sliding resistance becomes high in value when the door glass is moved in the vertical direction to be opened.

Further, as described in Japanese Utility Model Kokai (Laid-Open) No. 158321/81 for example, there has been made a proposal in which a flange secured to the door glass is guided by a vertical guide having elasticity in the thickness-wise direction of the door glass and additionally functioning as a door weather strip, to thereby decrease the sliding resistance when the door glass is opened or closed.

However, the construction of the door of the type described presents such disadvantages that a difference in stage occurs at a connecting portion between the top end of the door glass and a roof side portion, whereby it becomes difficult to effect the sealing and the door frame is increased in its width.

To obviate the above-described disadvantages, as described in West German Patent Publication No. 2809721 (Refer to FIGS. 1 and 2) for example, there has been made a proposal in which a guide groove 4 integral with a door frame 3 is formed on the side of a compartment 2 at an end portion of a door glass 1 in a motor vehicle M, and a slide piece 5 secured to the rear surface of the end portion of the door glass 1 (on the side of the compartment 2) is projected and engaged with the guide groove 4 in a manner to be slidable in the vertical direction, whereby the sliding resistance is reduced when the door glass 1 is opened or closed without the width of the door frame at the outer peripheral portion of the door glass 1 being increased.

In this case, the sealing between the door glass 1 and the door frame 3 is effected by a door glass weather strip 6 being in contact with a corner portion of the end edge 1A of the door glass 1, and the outer surface 6A of this door glass weather strip 6 and the outer surface 3A of the door frame 3 disposed on the side of the outer periphery of this door glass weather strip 6 are made substantially flush with the outer surface of the door glass 1.

The construction of the door shown in FIG. 2 presents such a disadvantage that, since the door glass weather strip 6 is interposed between the slide piece 5 and the door frame 3, the door glass weather strip 6 is very small in its size in the direction of the width of door, whereby, even if the end edge 1A of the door glass 1 is slightly shifted in its position, the sealing is not easily secured.

In view of this, if a rear contacting portion 6B of the door glass weather strip 6, which is in contact with the rear surface of the door glass 1, is increased in its width, then the positions of the slide piece 5 and the guide groove 4 must be moved to the left in FIG. 2 accordingly, and consequently, such a disadvantage is presented that the door frame is increased in its width.

Further, this construction of the door presents such a disadvantage that, since the slide piece 5 projects from the rear surface of the door glass 1, the guide groove 4 for guiding the slide piece 5 should project into the compartment to a large extent.

Furthermore, as indicated by a two-dot chain line in FIG. 2 for example, when such a construction is adopted that a pillar 7 is not observed from outside due to the presence of the door, an end portion 3B of the door frame 3 must be extended in the longitudinal direction of the vehicle, and hence, in this case also, there is presented the disadvantage that the door frame 3 should become large in its width.

In contrast thereto, as shown in FIG. 3, it may be proposed that, in a construction of a door in a motor vehicle, wherein a slide piece or pieces 12 secured to an end edge 11A of a door glass 11 of a side door 10 are slidably coupled into a guide groove 15 of a guide portion 14 of a door frame 13 to thereby guide the door glass 11 in the vertical direction, and the outer surface of the door glass 11 and the outer surface of the door frame 13 are substantially flush with each other, a door glass weather strip 16 for sealing between the door glass 11 and the door frame 13 is provided closer to the side of a compartment 17 than the guide portion 14, each slide piece 12 is secured to the forward end of a bracket 18 projecting outwardly from the end edge 11A of the glass 11 substantially in parallel to the glass surface, the guide portion 14 is opened toward the end edge 11A of the door glass 11 to thereby form a guide groove 15 for enclosing the slide piece 12, and an outer wall surface 14A of the guide portion 14 is made substantially flush with the door glass 11.

In this case, the door glass weather strip 16 is disposed at the side of the compartment 17 of the end edge 11A of the door glass 11, held by an outwardly directed channel portion 19 formed on the door frame 13, a lip 16A thereof is normally brought into contact with the rear surface of the end edge 11A of the door glass, to thereby block a gap formed between the end edge 11A and the door frame 13.

In FIG. 3, reference numeral 20 indicates a center pillar, and 21A and 21B indicate door weather strips secured to a front and a rear side doors 10A and 10B, respectively.

The center pillar 20 is disposed such that, when the front side door 10A and rear side door 10B are closed, the center pillar is shielded substantially invisibly from outside by the guide portions 14 of the door frames 13 of the both doors. Furthermore, the door weather strips 21A and 21B are opposed to a rearwardly directed channel portion 22A and a forwardly directed channel portion 22B, which are provided on the rear surfaces of the outwardly directed channel portions 19 of the door frames 13, in a manner to be directed rearwardly and forwardly respectively, and adopted to be in contact with the center pillar 20 when the front side door 10A and rear side door 10B are closed.

In the above-described construction of a door in a motor vehicle, the width of the center pillar 20 in the longitudinal direction is determined in accordance with a distance in the longitudinal direction between a frame surface 23A as being the forward end face of the rearwardly directed channel portion 22A to which is secured the door weather strip 21A of the front side door 10A and a frame surface 23B as being the rear end face of the forwardly directed channel portion 22B to which is secured the door weather strip 21B of the rear side door 10B. However, the distance between the frame surfaces 23A and 23B is large, and accordingly, even if hemmings 24A and 24B at the rear end of the front side door 10A and at the forward end of the rear side door 10B are minimized in their lengths, the width in the longitudinal direction of the center pillar 20 becomes considerable large. Hence, there are presented various disadvantages that the extent of convenience for an occupant to get in and out of the vehicle is lowered, the vehicle is increased in its weight, the degree of obstruction of the sight is increased, the appearance is deteriorated and so forth.

SUMMARY OF THE INVENTION

It is therefore the primary object of the present invention is to provide construction of a door in a motor vehicle, wherein the width and the value of projection into the compartment of the door frame are reduced while the door frame has a sufficient rigidity and the sealing between the door glass and the door frame is secured.

Another object of the present invention is to provide construction of the door in a motor vehicle, wherein the width of the center pillar is minimized whereby the extent of convenience for an occupant to get in and out of the vehicle is improved, the weight of the vehicle is decreased, the sight of the occupant is bettered and the appearance is improved.

To achieve the above-described objects, the present invention contemplates that, in the construction of the door in a motor vehicle, wherein the slide piece or pieces secured to the end portion of the door glass are slidably coupled into the guide groove of the guide portion of the door frame to thereby guide the door glass in the vertical direction, the outer surface of the door glass and the outer surface of the door frame are substantially flush with each other, and the construction includes a door glass weather strip for sealing between the door glass and the door frame and a door weather strip for sealing between the door and the body when the door is closed, the door glass weather strip is mounted at a portion closer to the compartment's side than the guide portion, whereby the width and the value of projection into the compartment of the door frame is reduced while the door frame has a sufficient rigidity and the sealing between the door glass and the door frame is secured.

To achieve the above-described objects, the present invention contemplates that, in the aforesaid construction of the door in a motor vehicle, the door weather strip is provided on the body in such a manner that the formed end of the door weather strip enters a portion of the difference in stage formed by an offset when the door is closed and comes into contact with the door, whereby the sealing between the door and the body is secured without increasing the width of the center pillar.

To achieve the above-described objects, the present invention contemplates that, in the construction of the door in a motor vehicle, wherein said door weather strip on the body's side is secured to a flange portion of the center pillar, has a cross-section of a substantially L-shape, a side of said L-shape in the thickness-wise direction of the door enters said portion of the difference in stage on the door's side and the inner side of said L-shape comes into contact with the door, when the door is closed.

To achieve the above-described objects, the present invention contemplates that, in the construction of the door in a motor vehicle, wherein said door weather strip is formed in such a manner that the forward end thereof on the center pillar's side is concealed by the door frame at the compartment's side.

To achieve the above-described objects, the present invention contemplates that, in the construction of the door in a motor vehicle, wherein said door weather strip is held in a channel portion being integral with said door frame and opened toward said center pillar in parallel to the outer surface of the door.

DETAILED DESCRIPTION OF THE PREFERRED EMBODIMENT

Description will hereunder be given of an embodiment of the present invention with reference to the drawings.

Figure 1:
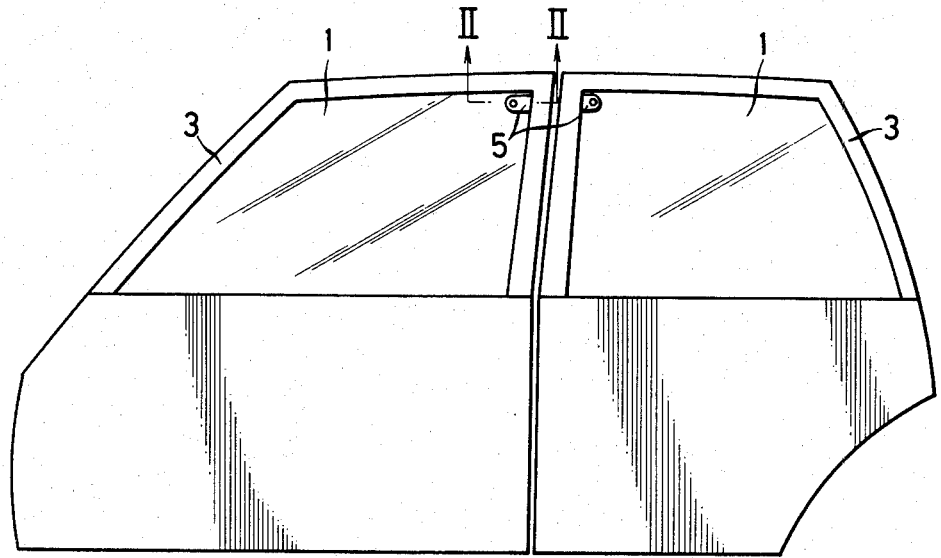
FIG. 1 is a front view showing the side door of a motor vehicle, to which is the present invention is to be applied.
Figure 2:
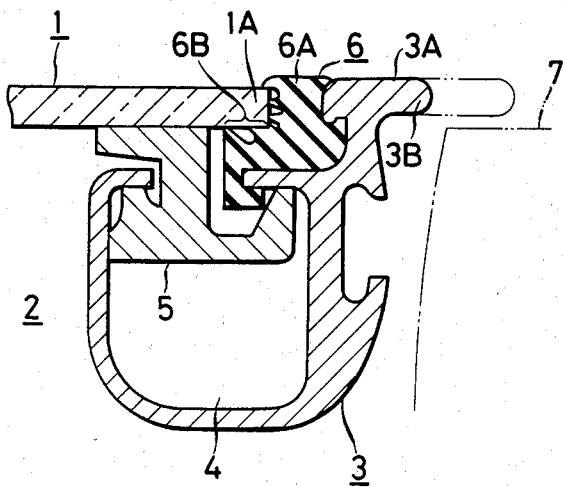
FIG. 2 is a sectional view taken along the line II—II in FIG. 1, showing the construction of the door in a motor vehicle of the prior art.
Figure 3:
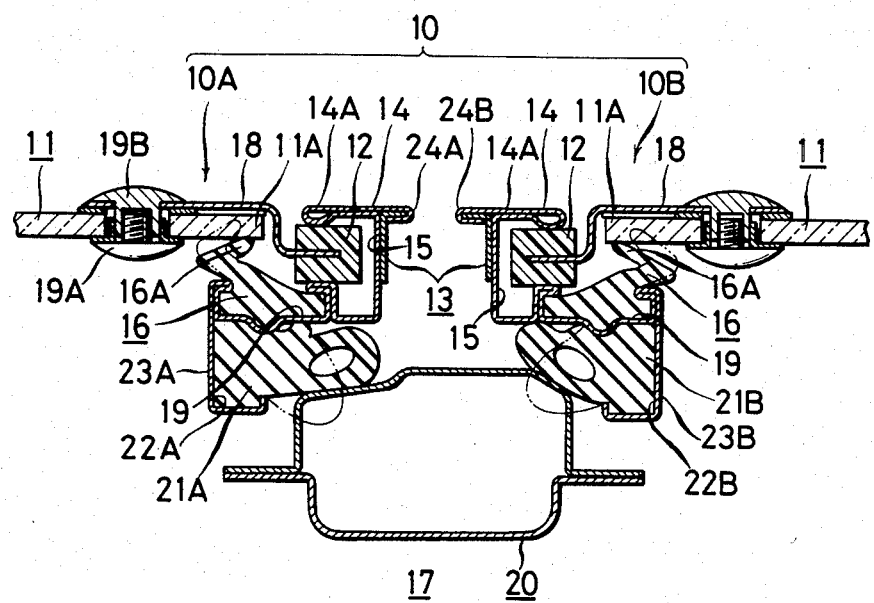
FIG. 3 is a sectional view similar to FIG. 2, showing the essential portions of the construction of the door in a motor vehicle, to which is present invention is to be applied.

In this embodiment, same reference numerals as shown in FIG. 3 are used to designate throughout the figures the same or similar parts in the construction of the door in a motor vehicle as shown in FIG. 3, so that detailed description thereof will be omitted.

Figure 4:
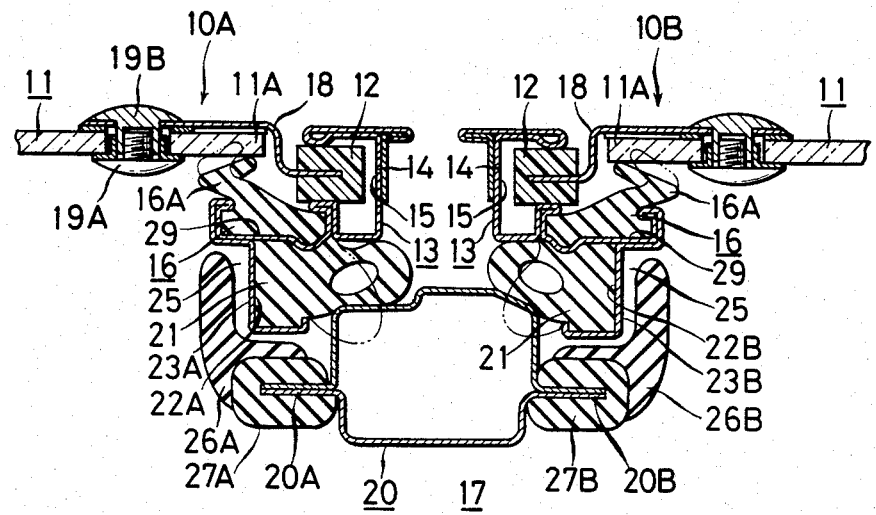
FIG. 4 is a sectional view similar to FIG. 3, showing the construction of the door in a motor vehicle embodying the present invention.

As shown in FIG. 4, in this embodiment, in the construction of the door in a motor vehicle, wherein the slide piece or pieces 12 secured to the end portions 11A of the door glass 11 are slidably coupled into the guide groove 15 of the guide portion 14 of the door frame 13 to thereby guide the door glass 11 in the vertical direction, the outer surface of the door glass 11 and the outer surface of the door frame 13 are substantially flush with each other, and the construction includes the door glass weather strip 16 for sealing between the door glass 11 and the door frame 13 and the door weather strip 21 for sealing between the door and the body when the door is closed, the door glass weather strip 16 is mounted at a portion closer to the side of the compartment 17 than the guide portion 14, each slide piece 12 is secured to the forward end of the bracket 18 projecting outwardly from the end edge 11A of the door glass 11 substantially in parallel to the glass surface, the guide portion 14 is opened toward the end edge 11A of the door glass 11 to thereby form the guide groove 15 for enclosing the slide piece 12, the outer wall surface 14A of the guide portion 14 is made substantially flush with the door glass 11, and the door weather strip 21 is mounted at a position offset toward the center pillar 20 in the longitudinal direction from the end face of the door glass weather strip 16, which is farthest from the center pillar 20 in the longitudinal direction and on the compartment's side in the rear of the door glass weather strip 16.

The door weather strips 21 are held in channel portions 22A and 22B being integral with the door frame 13 and opened toward said center pillar 20 in parallel to the outer surface of the door 10.

The door weather strips 21 are formed in such a manner that the forward end thereof on the center pillar's side is concealed by the door frame 13 at the compartment's side.

Mounted through center pillar opening trims 27A and 27B to flange portions 20A and 20B of the center pillar 20 are door weather strips 26A and 26B in such a manner that the forward ends of the door weather strips enter the portions of the difference in stage 25 due to the aforesaid offset and come into contact with the doors when the doors are closed.

More specifically, the door weather strips 26A and 26B on the body's side have a cross-section of a substantially L-shape, a side of said L-shape in the thicknesswise direction of the door enters said portion of the difference in stage on the door's side and the inner side of said L-shape comes into contact with the door, when the door is closed.

The aforesaid slide pieces 12 are formed of synthetic resin members molded at the forward ends of the brackets 18 fastened and fixed through screws 19A and nuts 19B to the door glass 11, in the front side door 10A, at least to the top end of the rear end edge thereof, and, in the rear side door 10B, at least to top end of the forward end edge thereof.

The aforesaid bracket 18 is formed into a crank shape so as to offset the slide piece 12 closer to the side of the compartment 17 than the door glass 11, so that the outer wall surface 14A of the guide portion 14 can be substantially flush with the outer surface of the door glass 11.

In this embodiment, the door glass weather strip 16 is disposed closer to the side of the compartment 17 than the guide portion 14 of the door frame 13, whereby the dimension of the door glass weather strip 16 in the widthwise direction is not regulated by the guide portion, so that the scope of contact with the door glass 11 can be increased, thereby enabling to secure the sealing with the guide portion 14 being not increased in width.

Further, in this embodiment, the guide portion 14 is disposed along the outer periphery of the door glass 11, so that the value of projection into the compartment 17 thereof can be reduced.

This embodiment is advantageous in that, when it is desired to make the pillar invisible from outside by the frame portions of the doors when the doors are closed, since the guide portions 14 are provided along the end edge 11A of the door glasses 11, the pillar can be covered by the guide portions 14, so that the pillar can be covered with the door frames 13 not being increased in width.

Furthermore, this embodiment is advantageous in that the frame surfaces 23A and 23B as being the forward end face and the rear end face of the rearwardly directed channel portion 22A and the forwardly directed channel portion 22B for holding the door weather strips 21A and 21B, respectively, are offset closer to the center pillar 20 than the forward end face and the rear end face of the outwardly directed channel portions 29 for holding the door glass weather strips 26, respectively, whereby distances from the door weather strips 21A and 21B to the center of the center pillar 20 can be reduced, so that the width in the longitudinal direction of the center pillar 20 can be decreased. Further, this embodiment is advantageous in that the forward ends of the door weather strips 26A and 26B on the body's side, which are secured to the flange portions 20A of the center pillar 20 enter the portions 25 formed between the forward end face and the rear end face of the outwardly directed channel portions 19 and the frame surfaces 23A and 23B, so that the sealing between the body and the door can be improved with the width in the longitudinal direction of the center pillar 20 not being decreased, and moreover, the appearance in the vicinity of the center pillar in looking from the compartment can be improved.

What is claimed is:

1. Construction of a door in a motor vehicle, wherein a slide piece or pieces secured to end portion of a door glass are slidably coupled into a guide groove of a guide portion of a door frame to thereby guide said door glass in the vertical direction, the outer surface of the door glass and the outer surface of the door frame are substantially flush with each other, and said construction includes a door glass weather strip for sealing between the door glass and the door frame and a door weather strip for sealing between the door and the body when the door is closed, characterized in that said door glass weather strip is provided closer to the compartment's side than said guide portion, said slide piece is secured to the forward end of a bracket projecting outwardly from an end edge of the door glass substantially in parallel to the glass surface, said guide portion is opened toward the end edge of the door glass to thereby form a guide groove for enclosing said slide piece, the outer wall surface of the guide portion is made substantially flush with the door glass, and said door weather strip is mounted at a position offset closer to a center pillar in the longitudinal direction than an end face of the door glass weather strip, which is farthest from the center pillar in the longitudinal direction and on the compartment's side in the rear of the door glass weather strip.

2. Construction of a door in a motor vehicle as set forth in claim 1, wherein a door weather strip on the body's side is provided in such a manner that the forward end thereof enters a portion of a difference in stage formed by said offset, when the door is closed.

3. Construction of a door in a motor vehicle as set forth in claim 2, wherein said door weather strip on the body's side is secured to a flange portion of the center pillar, has a cross-section of a substantially L-shape, a side of said L-shape in the thickness-wise direction of the door enters said portion of the difference in stage on the door's side and the inner side of said L-shape comes into contact with the door, when the door is closed.

4. Construction of a door in a motor vehicle as set forth in claim 1, wherein said door weather strip is formed in such a manner that the forward end thereof on the center pillar's side is concealed by the door frame at the compartment's side.

5. Construction of a door in a motor vehicle as set forth in claim 2, wherein said door weather strip is formed in such a manner that the forward end thereof on the center pillar's side is concealed by the door frame at the compartment's side.

6. Construction of a door in a motor vehicle as set forth in claim 3, wherein said door weather strip is formed in such a manner that the forward end thereof on the center pillar's side is concealed by the door frame at the compartment's side.

7. Construction of a door in a motor vehicle as set forth in claim 1, wherein said door weather strip is held in a channel portion being integral with said door frame and opened toward said center pillar in parallel to the outer surface of the door.

8. Construction of a door in a motor vehicle as set forth in claim 2, wherein said door weather strip is held in a channel portion being integral with said door frame and opened toward said center pillar in parallel to the outer surface of the door.

9. Construction of a door in a motor vehicle as set forth in claim 3, wherein said door weather strip is held in a channel portion being integral with said door frame and opened toward said center pillar in parallel to the outer surface of the door.

10. Construction of a door in a motor vehicle as set forth in claim 4, wherein said door weather strip is held in a channel portion being integral with said door frame and opened toward said center pillar in parallel to the outer surface of the door.

11. Construction of a door in a motor vehicle as set forth in claim 5, wherein said door weather strip is held in a channel portion being integral with said door frame and opened toward said center pillar in parallel to the outer surface of the door.

12. Construction of a door in a motor vehicle as set forth in claim 6, wherein said door weather strip is held in a channel portion being integral with said door frame and opened toward said center pillar in parallel to the outer surface of the door.

* * * * *